Patented Oct. 19, 1954

2,692,259

UNITED STATES PATENT OFFICE 2,692,259

POLYMERIZATION OF CONDITIONED OLEFIN CHARGING STOCKS WITH MOLYBDENUM CATALYSTS

Edwin F. Peters, Chicago, Ill., assignor to Standard Oil Company, Chicago, Ill., a corporation of Indiana No Drawing. Application April 28, 1951,
Serial No. 223,649

16 Claims. (Cl. 260—88.1)

This invention relates to a process for the polymerization of certain mono-olefinic hydrocarbons such as ethylene, propylene and the like and more particularly to a process for converting ethylene, propylene, and ethylene-propylene mixtures to polymerization products including normally solid polymers.

I have discovered that in the polymerization of olefins in the presence of catalysts containing subhexavalent molybdenum-oxygen compounds, oxygen and water exert undesirable effects, viz., markedly reducing the yield of desired polymers, substantially reducing the life of the polymerization catalyst and, in certain instances, greatly reducing the specific viscosity of the desired polymeric product.

One object of my invention is to provide a process for the polymerization of mono-olefinic hydrocarbons such as ethylene and propylene in the presence of catalysts containing a subhexavalent molybdenum-oxygen compound, in which process substantially deoxygenated and dehydrated olefinic charging stocks are employed, in order substantially to increase the period of activity of the catalyst between regenerations as well as the yields and specific viscosities of the polymeric products. Another object is to provide a process of the above type in which polymerization is effected in the presence of a hydrocarbon reaction solvent which has been substantially deoxygenated and dehydrated. An additional object of my invention is to provide a process for the conversion of ethylene to normally solid polymers by contacting substantially deoxygenated and dehydrated ethylene charging stock with a catalyst comprising essentially a subhexavalent molybdenum-oxygen compound. Still another object is to provide a process for the conversion of ethylene to normally solid polymers by contacting an ethylene charging stock containing less than 10 parts per million of oxygen and less than 0.5 weight percent of water with a catalyst comprising a subhexavalent molybdenum-oxygen compound in the presence of substantially deoxygenated and dehydrated liquid hydrocarbon reaction medium. These and other objects of my invention will become apparent from the ensuing description thereof.

It has been unexpectedly discovered that certain preconditioned molybdenum-oxygen compounds in combination with supporting or cocatalytic metallic oxides selected from the class consisting of gamma alumina, titania and zirconia are extremely effective catalysts for the conversion of ethylene, propylene, ethylene-propylene mixtures and the like to high molecular weight normally solid products as described in detail and claimed in applications for United States Letters Patent, Serial Numbers 223,641 and 223,643 of even date, assigned to the present assignee. The preconditioning of the catalysts involves treatment thereof with a reducing gas, particularly hydrogen, as will be described in detail hereinafter. Thus, ethylene can be polymerized to extremely high molecular weight normally solid polymers upon contact with a catalyst comprising essentially molybdena-gamma alumina and the like, said catalyst having been preconditioned for polymerization by treatment with a reducing agent (hydrogen, carbon monoxide, sulfur dioxide, or the like); the preconditioning treatment apparently converts at least a portion of the molybdenum in said catalysts to a subhexavalent state. The polymerization of ethylene and other feeds is preferably conducted in the presence of a liquid hydrocarbon reaction medium such, for example, as benzene, toluene, xylenes or the like. I have discovered that the above catalysts rapidly lose activity for polymerizing ethylene, propylene and similar charging stocks when said catalysts are exposed to oxygen and water. It appears that the catalysts in question contain subhexavalent molybdenum oxygen compounds and that the molybdenum in said catalysts is present in a highly reactive unsaturated condition due principally to two factors: (1) high degree of dispersion of molybdenum atoms upon gamma alumina or other support, rendering it readily available for reaction, and (2) the molybdenum is present to some extent at least in subhexavalent state.

In the course of tests, details of which will be supplied hereinafter, I found that as little as 10 mol percent of oxygen based on the molybdenum oxide concentration in the catalyst decreased the yield of normally solid ethylene polymers by 60 percent, and 20 mol percent oxygen decreased the yield by 87 percent. I have also observed that the addition of oxygen markedly reduces the specific viscosity of the normally solid polymers obtained. One possible explanation of these phenomena is that as oxygen is added the most available active centers of the catalyst are destroyed, leaving only the inner portion of the catalyst active; since the inner portion of the catalyst is less accessible to ethylene than the outer portions, normally solid ethylene polymers of lower specific viscosity may thus be produced.

As will be apparent from the experimental specified data supplied hereinafter, water is also a catalyst poison but, on a molar basis, is somewhat less detrimental than oxygen. The addition of 3.3 weight percent of water based on total molybdena-alumina catalyst in one instance reduced the yield of normally solid ethylene polymer by 82 percent without, however, substantially decreasing the specific viscosity of the polymer.

It is not certain whether the active centers of the catalyst chemisorb oxygen and water or whether actual chemical reaction with the formation of hexavalent molybdenum compounds occurs. It should be further understood that elements of theory have been advanced in the above discussion for the purpose of clarifying the invention but that the inventor does not consider himself bound by any particular theory of his invention.

Briefly, the process of the present invention comprises substantially deoxygenating and dehydrating an olefinic charging stock prior to contacting such stock with a polymerization catalyst comprising essentially a molybdenum-oxygen compound which has been preconditioned by treatment with a reducing gas. When said process is effected in the presence of a liquid hydrocarbon reaction medium it is further desirable to deoxygenate and dehydrate said medium prior to contact with said catalyst. The practice of the present invention leads to a substantial prolongation of catalyst life between reactivation treatments, substantial increases in the yields of desired polymers (especially normally solid ethylene polymers), and substantial increases in molecular weight of the solid polymers produced in said processes. I have made the important observation that the poisoning effects of oxygen and water on the catalyst in question are not simply stoichiometric in relation to the molybdenum concentration in said catalyst, but that quantities of oxygen and water far less than the amounts necessary to react with the entire molybdenum content in said catalyst markedly reduce or decrease the catalytic properties of said catalyst and effect the yield and sometimes the molecular weight of the polymerization product.

Prior art processes for the removal of small amounts of oxygen from hydrocarbon gas streams may be employed for the purpose of deoxygenating the olefin charging stock. By way of example, ethylene may be deoxygenated after being compressed to 750 p. s. i. g. and heated to about 300° F. by passage through a column packed with grains of metallic copper (reduced copper oxide). An alternative method of deoxygenation comprises contacting the ethylene or other charging stock, under desired pressure, with an alkali metal or an alkaline earth metal, for example, molten sodium or a sodium-potassium alloy. The oxygen content of ethylene is readily reduced below 10 parts per million by contacting it with molten sodium alloys at temperatures of about 125° C. to about 150° C. over a period of about ½ to about 12 hours.

An extremely suitable method for the dehydration and deoxygenation of ethylene or other olefinic charging stocks involves the sequential passage of said charging stocks through copper granules (reduced copper oxide) and through beds of highly adsorbent alumina gel or similar solid adsorbent. Thus passage of ethylene through a reduced copper oxide bed at 340° F. and 850 p. s. i. g., followed by passage through an adsorptive alumina gel at 70° F. and the same pressure readily reduces the oxygen content of commercial ethylene (about 20 to 10,000 p. p. m.) to 0–6 p. p. m. and the water content to an immeasurably low value. A number of commercially employed methods for the dehydration of natural gas with adsorbent alumina at high gas pressures have been described (Petroleum Engineer—Mid-year 1940, pages 82-4-6; March 1943, page 184) and are readily adapted for use with normally gaseous olefinic charging stocks for the present process. When the olefinic charging stock is passed through adsorptive alumina, silica gel or the like, not only is water removed from such stock but, in the case of ethylene and similar charging stocks derived by dehydration of alcohols, removal is also effected by volatile oxygenated organic compounds such as methanol, ethanol, acetaldehyde, ethyl ether, acetone, acetal and similar compounds which also function as poisons for reduced molybdenum oxygen containing polymerization catalysts.

Removal of volatile oxygenated organic compounds from ethylene and the like can also be effected by contacting the ethylene, which may be carefully fractionated if desired, with a suitable hydrocarbon solvent such as benzene, xylene, higher boiling aromatics or a paraffin hydrocarbon boiling in the range of 100–300° C. This contacting step is carried out under conditions such that the scrubbing solvent is maintained in the liquid phase, i. e. 15 to 100° C., with 15 to 2000 p. s. i. of ethylene pressure above the solvent. Contact between the solvent and the ethylene is accomplished by bubbling the ethylene up through a pool of solvent or by bubbling the ethylene into a mechanically agitated pool of solvent. The purified ethylene is drawn off the vapor phase above the scrubbing solvent. The purified ethylene is then passed through a condenser to condense out traces of the scrubbing solvent which may be carried over. The preferred conditions for operating my process are 12 to 40° C. with 15 to 1000 p. s. i. gage pressure of ethylene above the scrubbing solvent.

The deoxygenation and dehydration of the liquid hydrocarbon reaction medium is readily accomplished by distillation of said medium immediately prior to use in the present process. It will be found that the distillation bottoms are substantially degassed and dehydrated. However, inert gas stripping, for example with nitrogen, helium or carbon dioxide, can be practiced in order to effect oxygen removal from the liquid hydrocarbon reaction medium. Also, the liquid hydrocarbon reaction medium can be dehydrated by passage through or contact with a dessicant medium, for example $P_2O_5$, adsorptive alumina, magnesia or calcium oxide. Liquid hydrocarbons are readily dehydrated to water concentrations below 0.1 weight percent or even 0.01 weight percent.

For the purposes of the present invention it is desired to reduce the oxygen concentration in the olefinic charging stock and liquid hydrocarbon reaction medium to less than 1000 p. p. m. and preferably to less than 10 p. p. m. and to reduce the water concentration to less than 0.5 weight percent, preferably less than 0.1 weight percent. The use of completely deoxygenated and dehydrated charging stocks and liquid hydrocarbon reaction media is preferred, but the above mentioned limits upon oxygen and water represent practical and attainable values for a commercial process.

It will be understood that specific deoxygenation and dehydration processes have been described merely for illustrative purposes and that they form no part of the present invention. It will be appreciated that any means of attaining the stated objectives will be suitable for my purpose.

The inventive process will be described in detail hereinafter as it applies to the conversion of ethylene principally to normally solid polymers, although it will be appreciated that it is more broadly applicable, as indicated above.

The conversion of ethylene to high molecular weight normally solid polymers can be effected by contact thereof with a catalyst comprising essentially a reduced molybdenum oxide combined with an activated adsorptive alumina of the type of gamma-alumina, or with active titania or zirconia. The inventive process is effected at temperatures between about 75° C. and about 325° C., preferably between about 130° C. and 260° C., and pressures between about atmospheric and 5000 p. s. i. g. or higher, preferably between about 200 and 2000 or about 1000 p. s. i. g. The normally solid materials produced by the catalytic conversion tend to accumulate upon and within the solid catalyst. The rate of ethylene conversion and the extent of removal of solid polymeric conversion products from the catalyst can both be favorably influenced by maintaining the catalyst, during ethylene conversion, in contact with a liquid medium which serves both as a reaction medium and a solvent for the solid reaction products. Suitable liquid reaction media include various hydrocarbons, particularly an aromatic hydrocarbon such as benzene, toluene or xylenes. However, the conversion of ethylene-containing gas streams can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention leads to ethylene homopolymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000, and tough resinous ethylene homopolymers having an approximate specific viscosity ($\times 10^5$) of 10,000 to more than 300,000. By the operation of the present inventive process it has been possible for the first time, so far as is known, to produce tough ethylene polymers having specific viscosities ($\times 10^5$) of well over 100,000, and even over 300,000. In addition, the process of the present invention can be employed to effect the copolymerization of ethylene with other polymerizable materials and particularly with propylene. Propylene alone has been polymerized, by the employment of the catalysts of the present invention, in low yield to extremely high molecular weight, rubber-like polymers, in addition to oils and grease-like solids. Other polymerizable materials such as n-butylenes, isobutylene, acetylene, isoprene, etc., may be copolymerized with ethylene to a certain extent but the resultant polymers thus far produced closely resemble polymers obtained with ethylene alone.

In one aspect, my invention is directed to the employment of a solid catalyst comprising essentially a gamma-alumina base and a molybdenum-oxygen compound in a sub-hexavalent state, the preferred example of the latter being reduced molybdenum oxide ($MoO_3$). The relative proportions of gamma-alumina base to supported molybdena is not critical and may be varied throughout a relatively wide range provided that each component is present in amounts of at least approximately 1%. Molybdena alone, whether in reduced or unreduced state, is ineffective and likewise gamma-alumina by itself is ineffective. The preferred molybdena-alumina ratios are in the range of about 1:20 to 1:1, or approximately 1:4. A large number of other common catalyst supports have been tested with various amounts of molybdena and found to be ineffective. Likewise, other catalyst components recognized as equivalents for molybdenum oxide in hydroforming have been found ineffective in my process even when supported on gamma-alumina. I employ a conditioned alumina-molybdena catalyst composed of gamma-alumina base containing about 1 to 80%, preferably about 5 to 35%, or approximately 20%, of molybdena (or other compound of molybdenum and oxygen) supported thereon.

The gamma-alumina base of the catalyst may be prepared in any known manner and the molybdenum may likewise be incorporated in or deposited on the base in any known manner. Excellent results have been obtained with alumina-molybdenum catalysts of the type conventionally employed for effecting commercial hydroforming, the word "hydroforming" being employed to mean processes of the type described in U. S. Letters Patent 2,320,147, 2,388,536, 2,357,332, etc. Such catalysts usually fall into one of three categories from the standpoint of alumina base preparation:

(1) The "activated alumina" type prepared from hydrated alumina (commercially marketed as "Kellogg" catalyst),
(2) The gel type alumina base prepared by precipitating a gel from an alumina salt solution (commercially marketed as Oronite catalyst), and
(3) The colloidal gel type base prepared from aluminum metal (commonly known as Indiana gel catalyst).

With respect to preparation of gamma-alumina by dehydration of hydrated aluminas, reference may be made, for example, to Ind. Eng. Chem. 42, 1398 (1950), Ind. Eng. Chem. 37, 153 (1945), U. S. 2,453,327, and to Colloid Chemistry, second edition (1949), Harry B. Weiser, John Wiley & Sons Inc., New York. Gamma-alumina preparation by gel precipitation from salt solutions is disclosed, for example, in U. S. 2,432,286, 2,481,824, etc. Preparation of alumina supports from metallic aluminum is disclosed, for example, in U. S. 2,274,634 (Re. 22,196), 2,345,600, 2,371,237, etc.

While no novelty is claimed in the method of making alumina bases for the catalyst composition, it is important that the alumina in the base be in the gamma form and it is desirable to employ alumina bases or finished catalysts having surface areas in the range of 40 to 400 square meters per gram, as measured by nitrogen or n-butane adsorption (BET method). The molybdena or other molybdenum-oxygen compound, such as cobalt molybdate, may be incorporated in the catalyst base in any known manner, e. g. by impregnation, co-precipitation, co-gelling, and/or absorption, and the catalyst base and/or finished catalyst may be heat stabilized in the known manners heretofore employed in the preparation of hydroforming or hydrofining catalysts. Cobalt molybdate catalysts may be prepared as described in U. S. 2,393,288, 2,486,361, etc. The catalyst may be stabilized with silica (U. S. 2,437,532–3) or with aluminum ortho-phosphate (U. S. 2,440,236 and 2,441,297) or other known stabilizers or modifiers. The catalyst may contain calcium oxide (U. S. 2,422,172 and 2,447,043) or the base may be in the form of a zinc aluminate spinel (U. S. 2,447,016) and it may contain appreciable amounts of zirconia or titania (U. S. 2,437,531–2). Oxides of other metals such as magnesium, nickel, zinc, chromium, vanadium, thorium, etc., may be present in minor amounts, below 10 weight per cent and preferably below 1 weight per cent of the total catalyst. The catalyst, however, should be substantially free from oxides of alkali metals and iron, the latter being tolerable up to about 1%, but the former being maintained at as low a figure as possible.

The so-called "spent" molybdena-alumina catalysts from naphtha hydroforming operations are highly active catalysts for the polymerization of ethylene. The spent molybdena-alumina catalysts actually contain a substantial proportion of sulfur derived by the reaction of the molybdenum component of the catalyst with sulfur compounds contained in the naphtha being hydroformed or with H₂S produced by hydrogenation of sulfur compounds during hydroforming; the evidence indicates that some of the molybdenum in the spent catalyst is present as a sub-hexavalent molybdenum sulfide, probably mostly $MoS_2$. By "spent" hydroforming catalyst it is intended to denote a catalyst containing coke-like hydrocarbon materials and one which can be regenerated by the conventional methods to its active state for hydroforming. When a molybdena-alumina catalyst which has been employed for naphtha hydroforming has been regenerated many times it at last reached a "dead" state from which it cannot be regenerated; this "dead" state is associated with the conversion of gamma-alumina in the catalyst to the low surface area alpha-alumina, as determined by X-ray diffraction analysis.

The gamma-alumina component of the catalyst can be partially or wholly replaced by activated titania or zirconia, which can be prepared by methods known in the art in an active (adsorbent) state for purposes of catalysis.

The catalyst must be conditioned or activated before it is useful for effecting olefin polymerization and the conditioning step is of great importance. It appears that at least a part of the molybdenum is present in the final catalyst in a sub-hexavalent condition. Molybdenum is usually composited with the absorptive alumina, titania or zirconia in the form of a hexavalent molybdenum compound, such as $MoO_3$ which can be produced by decomposition of ammonium para-molybdate, and is thereafter conditioned to render it effective for catalyzing the polymerization of ethylene and/or other olefins. The conditioning step is preferably effected with hydrogen although other reducing gases such as carbon monoxide, mixtures of hydrogen and carbon monoxide (water gas, synthesis gas, etc.), sulfur dioxide, hydrogen sulfide, etc., may be employed. The temperature of the conditioning step should be upwards of about 300 to 350° C., but usually not higher than about 650° C., the best conditioning temperature usually being in the range of about 400 to 500° C., e. g. about 450° C. The hydrogen partial pressure in the conditioning step may range from ordinary pressure to 3000 p. s. i. g. or more, but for practical purposes is usually in the range of about 50 to 500, e. g. about 200 p. s. i. g.

The time required for the conditioning step is dependent upon the particle size of the catalyst and its molybdena content. The following information was obtained on molybdena-alumina catalysts. With a particle size of about 4 to 6 mesh, a molybdenum oxide content of about 7.5% at about 200 pounds pressure, and at a temperature of about 460° C., most effective conditioning with hydrogen is obtained at a time of about 15 minutes; in this case some conditioning was effected at a time interval as low as 1 second or as long as 6 hours or more. With increasing amounts of molybdenum on the catalyst, longer conditioning treatments are necessary and with decreased particle size, shorter times of conditioning are required. Thus, good activation of powdered catalyst containing 34% molybdena was obtained in 15 seconds, while this short time effected only fair conditioning of powdered catalyst containing 28% molybdena and was ineffective (apparently too long) for conditioning a catalyst containing 7.5% molybdena. For large particle sizes of the order of 2 to 6 mesh containing 7.5 to 30% or more of molybdena, the optimum conditioning time lies in the range of about 15 seconds to 15 hours, although usually 6 hours is ample.

The conditioning treatment hereinabove described is required not only for fresh catalyst, but is also required for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by burning combustible deposits therefrom with oxygen (usually in a state of high dilution in an inert gas, such as flue gas) followed by the conditioning step. It has been observed that the conditioning treatment necessary to effect reactivation of catalysts from which polymer product has been removed can be effected at somewhat lower temperatures than would be effective in the initial conditioning of fresh catalyst preparations.

The catalysts, comprising essentially a sub-hexavalent molybdenum compound supported upon an adsorptive alumina, titania or zirconia, can be employed in forms and sizes heretofore conventional in hydroforming operations with these and similar catalysts, for example, as pellets of generally cylindrical, spherical, or other shapes, or even in the form of coarse lumps. Conventionally, molybdena-alumina hydroforming catalysts are prepared by pelleting catalyst particles of which 100 per cent pass through a 30 mesh inch screen and which are retained to the extent of about 50 per cent on 100 mesh per inch screen. The pellets conventionally employed may range in size from about 2 to about 6 mesh per inch. A suitable form of pellet is of generally cylindrical shape, ⅜ inch long and ⅜ inch diameter. Powdered catalysts appear to be extremely active for polymerization, inducing ethylene polymerization at a higher rate to produce generally higher molecular weight polymers than relatively coarse catalysts. However, the small catalyst particles appear to become rapidly coated with solid, high molecular weight polymer and it is necessary to effect efficient removal of said polymer, e. g., by employing high solvent: catalyst ratios such as 5–50 pounds of solvent per pound of catalyst in the reactor.

The ethylene charging stocks may contain inert hydrocarbons, as in refinery gas streams, for example, methane, ethane, propane, etc. When the charging stock contains propylene as well as ethylene, both these olefins contribute to the production of resinous high molecular weight products. The charging stock may contain other components such as sulfur dioxide, carbon monoxide, etc., and it may contain other polymerizable materials such as butylene, acetylene, isoprene, etc.

In general, polymerization can be effected in the present process at temperatures between about 75° C. and about 325° C. Increasing the polymerization temperature tends to reduce the average molecular weight of the polymer produced by the process. It is often desirable to select a polymerization temperature which is at least equal to the melting or softening point of the solid polymerization product. Usually polymerization is effected in the present process at temperatures between about 110° C. and about 275° C. or the preferred narrower range of 130°–260° C. As will be noted from the specific examples hereinafter supplied, the conjoint use of polymerization temperatures between about 200° C. and about 250° C. and a liquid aromatic hydrocarbon reaction medium such as benzene or xylene is highly desirable in producing ethylene polymers having specific viscosities ($\times 10^5$) ranging on the average from about 10,000 to about 30,000 in continuous operations with relatively long on-stream periods and clean catalysts.

It has been found that the present process can be employed for the production of relatively high molecular weight ethylene hetero-and homo-polymers at relatively low pressures. For example, at a polymerization pressure of only about 1100 p. s. i. g., ethylene has been converted in substantial measure, according to the present process, to a homopolymer having a specific viscosity ($\times 10^5$) of about 200,000. These results are astounding when it is borne in mind that in prior art processes for the thermal polymerization of ethylene (as described in U. S. Patent 2,153,553) or polymerization of ethylene in the presence of oxygen as the catalyst (U. S. Patent 2,188,465), pressures in excess of 30,000 p. s. i. g. lead to the production of ethylene polymers having relatively low molecular weight, such as 24,000, as determined by the Staudinger specific viscosity method. The process of the present invention can be effected to some extent even at atmospheric pressure. The upper limit of polymerization pressure is dictated by economic considerations and equipment limitations and may be 10,000 p. s. i. g., 20,000 p. s i g., or even more. A generally useful and economically desirable polymerization pressure range is between about 200 and about 5000 p. s. i. g., preferably between about 500 and about 1500 p. s. i. g., e. g. about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually selected between about .1 and about 10 volumes, preferably about .5 to 5 or about 2 volumes of ethylene solution in a liquid reaction medium, which is usually an aromatic hydrocarbon such as benzene or xylenes. The amount of ethylene in such solutions should be in the range of about 1 to 30% by weight, preferably about 2 to 10 weight per cent or, for example, about 4 to 5 weight per cent. In batch operations, operating periods of between about one-half and about 10 hours, usually between about 1 and about 4 hours, are employed and the reaction autoclave is charged with ethylene as the pressure falls as a result of the ethylene conversion reaction.

Ethylene can be polymerized in the gas phase and in the absence of a liquid reaction medium by contact with the molybdenum hydroforming-type catalysts employed in the present process. Upon completion of the desired polymerization reaction it is then possible to treat the catalyst for the recovery of the solid polymerization products, for example by extraction with suitable solvents. However, in the interests of obtaining increased rates of ethylene conversion and of continuously removing solid conversion products from the catalyst, it is desirable to effect the conversion of ethylene in the presence of suitable liquid reaction media. The liquid reaction medium may also be employed as a means of contacting the ethylene with catalyst by employing the technique of preparing a solution of ethylene in the liquid reaction medium and contacting the resultant solution with the polymerization catalyst. Usually it is preferred to employ inert liquid organic materials such as hydrocarbons, particularly aromatics such as benzene, toluene, xylenes, and alkylated aromatics as reaction media in the present process.

The liquid reaction medium employed in the present process appears to perform a variety of functions, and to perform these functions in varying degrees depending upon the operating conditions, catalyst and identity of the medium. Thus, the liquid reaction medium appears to function as a solvent for the ethylene to bring the ethylene into the necessary contact with the catalyst surface and/or growing ethylene polymer chain. The liquid reaction medium may function to protect the growing polymer chain from chain breakers, such as reaction-inhibiting impurities in the feed stock, polymer already formed upon certain parts of the catalyst surface, etc. The liquid reaction medium serves to reduce the viscosity of the solid polymer retained upon and within the catalyst and thus may facilitate the process of transferring ethylene where it is needed. The medium dissolves some of the normally solid product from the catalyst surface. The liquid reaction medium makes possible a solid-liquid interface in which the growing ethylene polymer chain may be oriented and from which it may react with ethylene supplied from solution in the medium and/or from the gas phase. It should be understood, however, that I am in no way bound by the theoretical considerations herein advanced to explain possible modes of action of the inert liquid reaction medium.

The fact remains that the inclusion of the liquid medium in the polymerization reaction zone in contact with the catalyst produces an unpredictable and desirable change in the polymerization of ethylene conducive to the formation of high yields of normally solid hydrocarbon products. A particularly desirable effect of the liquid reaction medium is to increase substantially the rate of ethylene polymerization.

Various classes of individual hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, I may employ such aromatic hydrocarbons as ethylbenzene, isopropylbenzene, n - propylbenzene, sec - butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

I may also employ certain alkyl naphthalenes which are liquid under the polymerization reaction conditions, for example, 1-methyl-naphthalene, 2-isopropylnaphthalene, 1-n-amylnaphthalene and the like, or commercially produced fractions containing these hydrocarbons.

The aromatic hydrocarbons may contain more or less saturated hydrocarbons, as commercially produced, but should be freed of sulfur compounds, polyolefins and aromatic olefins such as styrene before use in the present invention by acid treatment, e. g., with anhydrous p-toluenesulfonic acid, sulfuric acid, or by equivalent treatments, for example with maleic anhydride, sodium, etc., or by combinations of suitable treatments.

Certain classes of aliphatic hydrocarbons can also be employed as a liquid hydrocarbon reaction medium in the present process. Thus, I may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, I may employ straight run naphthas or kerosenes containing alkanes and cycloalkanes. Specifically, I may employ liquid or liquefied alkanes such as n-pentane, n-hexane, 2,3-dimethylbutane, n-octane, n-decane, n-dodecane, cyclohexane, methylcyclohexane, dimethylcyclopentane, ethylcyclohexane and the like.

I may also employ a liquid hydrocarbon reaction medium comprising liquid olefins, e. g., n-hexenes, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity reducing hydrocarbon, such as those mentioned above, thereto in the reaction zone.

In addition to, or as a less desirable substitute for, the liquid hydrocarbon reaction media of the type above described, I may employ inert chlorinated hydrocarbons such as chlorobenzene, paradichlorobenzene and the like.

The liquid hydrocarbon reaction medium may be present in the polymerization reaction zone in proportions of about 10 to about 99 per cent by weight, based on the weight of both ethylene and reaction medium. The liquid hydrocarbon reaction medium is present in the reaction zone as a distinct liquid phase. At low ratios of ethylene to the hydrocarbon reaction medium, for example ratios between about 1 and about 30 per cent, temperature control during the course of the ethylene conversion process can be readily accomplished owing to the presence in the reaction zone of a large liquid mass having relatively high heat capacity. The liquid hydrocarbon reaction medium can, moreover, be cooled by indirect heat exchange inside or outside the reaction zone. The employment of low ethylene concentrations in the hydrocarbon reaction medium also results in a marked reduction in the rate of accumulation of solid polymers on the catalyst in continuous operations.

The present polymerization process is amenable to a considerable variety of processing techniques and expedients. Thus, when polymerization of ethylene is effected from the gaseous phase and in the absence of a liquid hydrocarbon reaction medium, the catalyst may be employed in the form of fluidized particles or a fluidized fixed bed of particles, as a fixed bed, or as a countercurrent moving bed of particles; these techniques being well known in the art of vapor phase hydrocarbon conversion, particularly catalytic cracking, and not being part of the claimed invention, need not be detailed here.

Catalyst coated with solid polymers produced in such vapor phase processes can be treated to recover solid polymerization products and to cleanse the catalyst, employing as solvents liquid hydrocarbons which may be the same as the liquid hydrocarbon reaction media above described, certain chemically inert chlorinated hydrocarbon solvents or other solvents. The catalyst thus cleansed can be returned to the process, preferably after being subjected to an activation treatment with a reducing gas, such as hydrogen. If desired, the extracted catalyst can be subjected to alternate oxidation and reduction treatments to reactivate it.

A fixed bed reactor with either downflow or upflow of ethylene and liquid hydrocarbon reaction medium can be employed. Parallel fixed bed reactors can be employed to obtain continuous operation, as in fixed bed hydrocarbon catalytic cracking units, one bed being freed from polymer and/or reconditioned while the other bed is on stream by suitable manual or automatic time-cycle valve operations to control the flows of ethylene, liquid hydrocarbon reaction medium, solvent and conditioning or regeneration gases to each bed of catalyst.

A moving bed or slurry operation can be employed, in which a slurry of catalyst in the liquid hydrocarbon reaction medium is allowed to flow downwardly through a tower or through one or more tubes. Ethylene or a solution of ethylene in liquid hydrocarbon reaction medium is injected into the lower portion of the tower or tubes and, optionally, at various elevations within the tower or tubes. A slurry of catalyst and solid polymerization products is withdrawn as one stream from the reactor and unconverted ethylene and/or diluent gases and/or relatively low boiling polymerization products are withdrawn from the reactor as a second stream. In the moving bed operation, the solid ethylene polymers are separated from the catalyst in a zone external to the reaction zone. Thus, the catalyst can be extracted with the liquid hydrocarbon reaction medium or with a specially selected wax solvent in suitable equipment and the catalyst can then be recycled to the reactor. If catalyst activity has deteriorated seriously, the polymer-freed catalyst can be subjected to a regeneration treatment prior to its recycle to the reaction zone.

As will be apparent, other types of reactor may also be employed. Thus, the polymerization can be carried out batchwise in autoclaves equipped with stirring equipment, for example in autoclaves equipped with magnetically-operated stirring devices. Likewise, stirred autoclaves can be employed even for continuous operations. A type of reactor which may be employed is that described in U. S. 2,493,917. In another method of operation, catalyst, ethylene and liquid hydrocarbon reaction medium can be passed concurrently through a reaction tube or coil, thence to a separator.

In carrying out the polymerization of ethylene in contact with the catalysts of the present invention and liquid aromatic hydrocarbon reaction media, it was found that the polymers which dissolved in the reaction medium were usually characterized as being of substantially lower specific viscosity than the polymers which were retained upon and within the catalyst. Also, successive extraction of the catalyst containing polymers removed polymer fractions of successively increasing specific viscosity.

It is desirable to remove occluded solid resinous conversion products from the catalyst and to reactivate the catalyst when about 10 to about 300 grams of said resinous conversion products have accumulated per 100 grams of catalyst. It has been observed that substantial reduction in activity of the catalyst is apparently not due only to the accumulation of solid resinous ethylene conversion products thereon, since extraction of said resinous products from the catalyst is in itself not enough to fully restore catalyst activity. It has been found that catalyst containing 10 to 30 grams of resinous products per 100 grams of catalyst can be regenerated by a treatment of the type employed initially to activate the fresh catalyst, preferably following extraction of polymer and/or resinous materials from the partially spent catalyst.

The regeneration of partially spent catalyst by treatment with hydrogen or other reducing agents can be effected under the same conditions employed for initial activation of a batch of fresh catalyst, but it has been found possible to use much milder conditions, i. e., lower temperatures and pressures. Thus, some regeneration of a partially spent cobalt molybdate-alumina catalyst can be effected under the very mild conditions of 65 C., a partial pressure of hydrogen of 500 p. s. i. g. and time of 1.0 hour.

In order to extract the high molecular weight ethylene polymers which tend to be tenaciously retained within the pores of the catalyst, it is important to conduct the extraction operation at a minimum temperature which lies between about the softening points and melting points of the polymers, usually temperatures within the range of about 80° C. to about 150° C., and which may extend to considerably high temperatures, e. g., up to about 325° C. When a relatively low boiling solvent such as benzene is employed it will be necessary to conduct the extraction or catalyst cleansing under sufficient pressure to maintain the solvent substantially in the liquid phase at the desired extraction temperature.

The solute can be recovered from the solvent by conventional methods, for example by cooling, by evaporation of the solvent from the solute or by dilution of the solution with antisolvents, such as acetone, methyl ethyl ketone, methyl isobutyl ketone, etc. A suitable method of operation involves cooling the hot solution to effect precipitation of one or more fractions of solute, the highest specific viscosity fractions of the solute being the first precipitates, and separating one or more precipitates from the remaining solution by filtration. Sometimes the operation of the present process leads to the production of more or less grease-like low molecular weight polymers having the consistency of petrolatum or soft grease and characterized by an approximate molecular weight range of 300 to 700; the grease-like products are characterized by their solubility in aromatic hydrocarbon solvents such as xylenes even at room temperature. The grease-like ethylene polymers (which may contain aromatic groups introduced by alkylation) can be separated from the xylene solvent by evaporation of the latter, preferably after separating high molecular weight polymers by cooling and filtration, as described above.

In Table 1 are presented data obtained in illustrative batch polymerization tests. The reactor employed was a rocking bomb or autoclave having 183 ml. capacity. In each instance, except as otherwise noted, the reactor was charged with catalyst and the catalyst was conditioned or activated. The conditioning or activation of catalyst was effected in the reactor with hydrogen gas at about 150 p. s. i. g. The activation process apparently reduced some of the $MoO_3$ on the alumina to a lower state of oxidation. The reactor was then charged with 100 ml. of freshly distilled liquid reaction medium and pressured with treated commercial cylinder ethylene to about 1100 p. s. i. g. at reaction temperature. The polymerization was effected over periods of about 2 to 4 hours at the temperatures indicated. Ethylene was pressured into the reactor intermittently to maintain ethylene pressure. Upon completion of a polymerization test, the reactor was allowed to cool to room temperature, then depressured to atmospheric pressure, opened and the catalyst-liquid reaction medium mixed with additional solvent and subjected to extraction at the normal boiling point of the solvent. After the extraction operation, the clear solution was decanted from the catalyst.

A substantial proportion of the polyethylene, especially the polymers of high molecular weight, are more or less tenaciously retained upon and within the catalysts. Extraction of the catalysts with a suitable solvent, usually boiling commercial xylenes, removes some of the polymer, which separates from solution on cooling. The "grease" product of the tables is a relatively low molecular weight polyethylene (about 300–700 molecular weight by the Menzies-Wright method) obtained by evaporating the xylene solvent after filtering the high molecular weight polyethylenes which separate from the solvent at temperatures below the boiling point. The "grease" is readily soluble in xylenes and other aromatic solvents at room temperature.

The catalysts are designated in the tables by the type of gamma-alumina base and the weight per cent of contained molybdenum oxide (as $MoO_3$). Referring to Table 1 the catalysts were employed as $\frac{1}{16}$ inch pellets except as otherwise noted. The $mAl_2O_3$ catalyst which was employed was prepared by the coprecipitation of molybdena, from ammonium paramolybdate, with an alumina sol prepared by the action of dilute acetic acid and mercuric oxide on aluminum having a purity in excess of 99.5 per cent, substantially as described in U. S. 2,371,237. The $sAl_2O_3$ catalyst was a commercial hydroforming catalyst marketed by the Oronite Chemical Co.

Feed stocks of known oxygen content were prepared by adding oxygen to deoxygenated ethylene. The procedure for determining oxygen content which I employed has been described (Anal. Chem. 20, No. 11 (November 1948), pp. 1033–1037).

The specific viscosity $(N_{sp}) \times 10^5$ of the high molecular weight polyethylenes was determined by measurements performed upon solutions containing 0.125 gram of polyethylene per 100 ml. xylene at a temperature of 110° C.

Runs 2 and 3, which should be compared with run 1 as the standard, indicate that the presence even of small proportions of water, based on ethylene or molybdena-alumina catalyst in the reaction zone, markedly reduces the yield of polyethylene, although apparently not its molecular weight. In run 2, 35 grams of ethylene and 0.2493 gram of water (0.71 weight per cent water, based on ethylene) were charged. In run 3, 35 grams of ethylene and 0.4985 gram of water (1.42 weight per cent water, based on ethylene) were charged.

The effects of oxygen in reducing both the yield and specific viscosity of the polyethylene are illustrated in runs 4 and 5, which should be compared with run 1 as the standard.

The data obtained in run 6 indicate that the reduced molybdena-alumina catalysts are very sensitive to oxygen, only 19 mol per cent of the quantity theoretically required to oxidize the molybdenum present in the catalyst from the dioxide to the trioxide being sufficient to effect substantial deactivation of the catalyst. These data would appear to indicate that the concentration of the actual active component of the catalyst is substantially less than its total molybdenum content. Run 6 should be compared with run 7, which was an oxygen-free standard.

*Table 1*

| Run No. | Catalyst | Wt. of Catalyst, g. | $O_2$ in $C_2H_4$, p. p. m. | Liquid Reaction Medium | Polym. Temp., °C. | Polyethylene g.* | Polyethylene $N_{sp} \times 10^5$ | Grease, g.* | Remarks |
|---|---|---|---|---|---|---|---|---|---|
| 1 | $mAl_2O_3$, 7.5% $MoO_3$ | 15 | 3 | Xylene | 230 | 0.53 | 45,400 | 0.02 | Pelleted catalyst was used and was activated with $H_2$ for 5 min. at 450° C. |
| 2 | $mAl_2O_3$, 7.5% $MoO_3$ | 15 | 3 | ...do... | 230 | 0.22 | 55,500 | 0.03 | 1.65 wt. percent $H_2O$, based on total weight of cat. was added. |
| 3 | $mAl_2O_3$, 7.5% $MoO_3$ | 15 | 3 | ...do... | 230 | 0.09 | 40,800 | 0.03 | 3.3 wt. percent $H_2O$, based on total weight of catalyst was added. |
| 4 | $mAl_2O_3$, 7.5% $MoO_3$ | 30 | 837 | ...do... | 230 | 0.20 | 32,500 | 0.03 | Pelleted cat. was used and was activated with $H_2$ for 5 min. at 450° C. Prior to polymerization, 10% of oxygen, based on $MoO_2$ in the catalyst, was added. |
| 5 | $mAl_2O_3$, 7.5% $MoO_3$ | 30 | 1,670 | ...do... | 230 | 0.07 | 22,500 | 0.03 | Pelleted cat. was used and was activated with $H_2$ for 5 min. at 450° C. Prior to polymerization, 20% of oxygen, based on $MoO_2$ in the catalyst, was added. |
| 6 | $sAl_2O_3$, 8% $MoO_3$ | 32 | 4,080 | ...do... | 127 | 0.1 | | | Oxygen, 19 mol percent of the amount required to oxidize $MoO_2$ to $MoO_3$ in the catalyst was charged after catalyst activation and prior to polymerization. Catalyst activation was obtained by treatment with $H_2$ for 60 minutes at 425° C. and 400 p. s. i. g. Catalyst was ⅜ inch pellets. |
| 7 | $sAl_2O_3$, 8% $MoO_3$ | 26 | 0 | ...do... | 132 | 9.5 | Insol | 0.4 | Activation of catalyst with $H_2$ at 455° C., 600 p. s. i. g., 60 minutes. |

*Per gram of catalyst.

*Table 2.—Ethylene polymerization—flow reactor*

| Run No. | 8 | | | | | | | | |
|---|---|---|---|---|---|---|---|---|---|
| | A | B | C | D | E | F | G | H | I |
| Catalyst | (¹) | (¹) | (¹) | (¹) | (¹) | (¹) | (¹) | (¹) | (¹) |
| Activation with $H_2$: | | | | | | | | | |
| Temp., °C | 450 | 450 | 450 | None | 450 | None | 450 | 450 | 450. |
| Time, min | 5 | 5 | 5 | ...do... | 5 | ...do... | 5 | 5 | 5. |
| Solvent | Benzene | Benzene | Benzene | Benzene | Benzene | Benzene | Benzene | Benzene | Benzene. |
| Ethylene conc. in Solvent | 15.2 | 11.5 | 20.0 | 20.0 | 15.5 | 17.5 | 17.5 | 13.0 | 3.9. |
| Temperature, °C | 243 | 250 | 243 | 238 | 238 | 236 | 266 | 252 | 240. |
| Pressure, p. s. i | 1,200 | 1,200 | 1,200 | 1,200 | 1,200 | 1,200 | 1,200 | 1,200 | 1,200. |
| Space velocity, V./V./hr | 2.6 | 3.0 | 2.7 | 2.6 | 2.2 | 2.3 | 1.9 | 2.3 | 2.5. |
| Duration of run, min | 69 | 121 | 95 | 54 | 143 | 70 | 93 | 164 | 143. |
| Ethylene conv., percent | 78 | 54 | 62 | 23 | 82 | 39 | 84 | 48 | 56. |
| Total products, g | 41 | 58 | 30 | 10 | 50 | 7 | 37 | 37 | 45. |
| Product distribution, percent: | | | | | | | | | |
| Alkylate | 58 | 48 | 37 | 59 | 42 | 56 | 41 | 21 | 57. |
| Polyalkylate and polymer | | | | | | | 32 | 26 | 14. |
| Solid Polyethylenes | 42 | 52 | 63 | 41 | 58 | 44 | 27 | 53 | 29. |
| $N_{sp} \times 10^5$ (Solid Polyethylenes) | 21,900 | 17,900 | 22,100 | 39,000 | 19,200 | | 8,300 | 8,900 | 18,500. |

¹ $sAl_2O_3$—8% $MoO_3$.

Table 2 is devoted to data obtained on flow polymerization of ethylene in the presence of benzene as the reaction medium. Run 8 was a life test, effected in nine operating periods, with hydrogen reactivation of the catalyst except after periods C and E. The ethylene charging stock contained 5 p. p. m. of oxygen and no water. The benzene employed was freshly distilled to effect dehydration and deoxygenation thereof. After each operating period, except as indicated, the catalyst was leached of accumulated polymer by circulating benzene therethrough and was then reconditioned by hydrogen treatment. When the catalyst was removed from the reactor at the end of the life test, there was no evidence of catalyst disintegration. Approximately one gram of solid polyethylenes was produced per gram of catalyst during the life test and the polyethylenes were tough and flexible.

The polymers produced by the process of this invention can be subjected to such after-treatment as may be desired, to fit them for particular uses or to impart desired properties. Thus, the polymers can be extruded, mechanically milled, filmed or cast or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc. to even a wider extent than polyethylenes made by prior processes.

The polymers produced by the process of the present invention, especially the polymers having high specific viscosities in excess of about 100,000, can be blended with the conventional lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and 1 per cent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity $\times 10^5$ of about 50,000 in about ten liters of xylenes at a temperature close to the boiling point produced an extremely viscous solution.

The polymers produced by the present process can be subjected to chemical modifying treatments, such as halogenation, halogenation followed by dehalogenation, sulfonation, and other reactions to which hydrocarbons may be subjected.

Having thus described my invention, what I claim is:

1. A process for producing a solid polymer which comprises contacting a normally gaseous monoolefinic hydrocarbon charging stock having an oxygen concentration below about 1000 p. p. m. and a water concentration below about 0.5 weight percent with an activated catalyst at a suitable polymerization temperature, and recovering a solid polymer thus produced, said catalyst, before activation, comprising essentially at least one weight percent each of a hexavalent molybdenum-oxygen compound and a metal oxide selected from the class consisting of gamma-alumina, titania and zirconia, activation of said catalyst before use thereof in polymerization being effected by partially reducing said hexavalent molybdenum-oxygen compound when present on said metal oxide by treatment with a reducing gas at a temperature of at least about 300° C.

2. The process of claim 1 wherein the hexavalent molybdenum-oxygen compound is molybdenum trioxide.

3. The process of claim 1 wherein the hexavalent molybdenum-oxygen compound is cobalt molybdate.

4. The process of claim 1 wherein said reducing gas is selected from the class consisting of hydrogen, carbon monoxide, mixtures of hydrogen and carbon monoxide, and sulfur dioxide.

5. A process for producing a solid polymer which comprises contacting a charging stock selected from the class consisting of ethylene, propylene, and ethylene-propylene mixtures, said charging stock having an oxygen concentration below about 1000 p. p. m. and a water concentration below about 0.5 weight percent, which process comprises contacting said charging stock with an activated catalyst at a suitable polymerization temperature and recovering a solid polymer thus produced, said catalyst, before activation, comprising essentially at least one weight percent each of a hexavalent molybdenum-oxygen compound and a metal oxide selected from the class consisting of gamma-alumina, titania and zirconia, activation of said catalyst before use thereof in polymerization being effected by partially reducing said hexavalent molybdenum-oxygen compound when present on said metal oxide by treatment with a reducing gas at a temperature of at least about 300° C.

6. The process of claim 5 wherein said hexavalent molybdenum-oxygen compound is molybdenum trioxide.

7. The process of claim 5 wherein said hexavalent molybdenum-oxygen compound is cobalt molybdate.

8. A process for producing a solid polymer from a charging stock selected from the class consisting of ethylene, propylene, and ethylene-propylene mixtures, said charging stock having an oxygen concentration below about 10 p. p. m. and a water concentration below about 0.5 weight percent, which process comprises contacting said charging stock in the presence of a liquid hydrocarbon reaction medium containing not more than about 10 p. p. m. of oxygen and not more than about 0.5 weight percent of water with an activated catalyst at a suitable polymerization temperature between about 75° C. and about 325° C., and recovering a solid polymer thus produced, said catalyst, before activation, comprising essentially at least one weight percent each of a hexavalent molybdenum-oxygen compound and a metal oxide selected from the class consisting of gamma-alumina, titania and zirconia, activation of said catalyst before use thereof in polymerization being effected by partially reducing said hexavalent molybdenum-oxygen compound when present on said metal oxide by treatment with a reducing gas at a temperature of at least about 300° C.

9. The process of claim 8 wherein said hexavalent molybdenum-oxygen compound is molybdenum trioxide.

10. The process of claim 8 wherein said hexavalent molybdenum-oxygen compound is cobalt molybdate.

11. A process for producing a solid polymer from a charging stock selected from the class consisting of ethylene, propylene, and ethylene-propylene mixtures, said charging stock having an oxygen concentration below about 1000 p. p. m., which process comprises contacting said charging stock with an activated catalyst at a suitable polymerization temperature and recovering a solid polymer thus produced, said catalyst, before activation, comprising essentially at least one weight percent each of a hexavalent molybdenum-oxygen compound and a metal oxide selected from the class consisting of gamma-alumina, titania and zirconia, activation of said catalyst before use thereof in polymerization being effected by partially reducing said hexavalent molybdenum-oxygen compound when present on said metal oxide by treatment with a reducing gas at a temperature of at least about 300° C.

12. The process of claim 11 wherein said hexavalent molybdenum-oxygen compound is molybdenum trioxide.

13. The process of claim 11 wherein said hexavalent molybdenum-oxygen compound is cobalt molybdate.

14. A process for producing a solid polymer from a charging stock selected from the class consisting of ethylene, propylene, and ethylene-propylene mixtures, said charging stock having a water concentration below about 0.5 weight percent, which process comprises contacting said charging stock with an activated catalyst at a suitable polymerization temperature and recovering a solid polymer thus produced, said catalyst, before activation, comprising essentially at least one weight percent each of a hexavalent molybdenum-oxygen compound and a metal oxide selected from the class consisting of gamma-alumina, titania and zirconia, activation of said catalyst before use thereof in polymerization being effected by partially reducing said hexavalent molybdenum-oxygen compound when present on said metal oxide by treatment with a reducing gas at a temperature of at least about 300° C.

15. The process of claim 14 wherein said hexavalent molybdenum-oxygen compound is molybdenum trioxide.

16. The process of claim 14 wherein said hexavalent molybdenum-oxygen compound is cobalt molybdate.

References Cited in the file of this patent

UNITED STATES PATENTS

| Number | Name | Date |
| --- | --- | --- |
| 2,351,167 | Ware | June 13, 1944 |
| 2,393,288 | Byrns | Jan. 22, 1946 |
| 2,572,300 | Arnold et al. | Oct. 23, 1951 |